(12) United States Patent
Wakefield et al.

(10) Patent No.: US 7,451,591 B2
(45) Date of Patent: Nov. 18, 2008

(54) PRODUCTION ENHANCEMENTS ON INTEGRATED GASIFICATION COMBINED CYCLE POWER PLANTS

(75) Inventors: David W. Wakefield, Houston, TX (US); Robert G. Jackson, Houston, TX (US); Xiao Rong Jackson, Xian (CN)

(73) Assignee: Econo-Power International Corporation, Houston, TX (US)

( * ) Notice: Subject to any disclaimer, the term of this patent is extended or adjusted under 35 U.S.C. 154(b) by 254 days.

(21) Appl. No.: 11/382,077

(22) Filed: May 8, 2006

(65) Prior Publication Data

US 2007/0256422 A1 Nov. 8, 2007

(51) Int. Cl.
*F02C 3/26* (2006.01)
(52) U.S. Cl. .................. 60/39.464; 60/39.12
(58) Field of Classification Search .......... 60/781, 60/39.464, 39.12, 39.182, 39.511
See application file for complete search history.

(56) References Cited

U.S. PATENT DOCUMENTS

| | | | | |
|---|---|---|---|---|
| 3,446,012 A | * | 5/1969 | Foster-Pegg | 60/781 |
| 3,481,834 A | * | 12/1969 | Squires | 201/17 |
| 3,639,111 A | | 2/1972 | Brink et al. | |
| 3,804,606 A | * | 4/1974 | Archer et al. | 48/206 |
| 4,017,272 A | | 4/1977 | Anwer et al. | |
| 4,069,024 A | | 1/1978 | Fernandes | |
| 4,085,578 A | * | 4/1978 | Kydd | 60/781 |
| 4,092,825 A | * | 6/1978 | Egan | 60/781 |
| 4,097,361 A | | 6/1978 | Ashworth | |
| 4,212,160 A | * | 7/1980 | Blaskowski | 60/39.12 |
| 4,472,936 A | * | 9/1984 | Uchiyama et al. | 60/773 |
| 4,498,909 A | | 2/1985 | Milner et al. | |
| 4,583,992 A | | 4/1986 | Rogers | |
| 4,667,467 A | * | 5/1987 | Archer et al. | 60/781 |
| 4,764,185 A | | 8/1988 | Mayer | |
| 4,785,622 A | * | 11/1988 | Plumley et al. | 60/39.12 |
| 4,866,928 A | * | 9/1989 | Raiko | 60/775 |
| 4,948,387 A | | 8/1990 | Martin et al. | |
| 4,973,337 A | | 11/1990 | Jokisch et al. | |
| 5,050,374 A | * | 9/1991 | Hunter | 60/780 |
| 5,069,685 A | * | 12/1991 | Bissett et al. | 48/77 |
| 5,243,922 A | * | 9/1993 | Rehmat et al. | 110/233 |
| 5,388,395 A | * | 2/1995 | Scharpf et al. | 60/781 |
| 5,517,815 A | * | 5/1996 | Fujioka et al. | 60/39.12 |
| 5,688,296 A | * | 11/1997 | Andrus et al. | 48/197 R |
| 5,895,508 A | | 4/1999 | Halow | |
| 5,953,899 A | * | 9/1999 | Rao et al. | 60/781 |
| 5,964,085 A | * | 10/1999 | Newby | 60/781 |
| 6,032,456 A | * | 3/2000 | Easom et al. | 60/793 |
| 6,133,328 A | | 10/2000 | Lightner | |
| 6,141,796 A | * | 11/2000 | Cummings | 60/39.12 |
| 6,167,691 B1 | * | 1/2001 | Yoshikawa et al. | 60/39.12 |
| 6,247,301 B1 | * | 6/2001 | Brannstrom et al. | 60/39.12 |
| 6,711,903 B1 | * | 3/2004 | Rich, Jr. | 60/781 |
| 2001/0001171 A1 | * | 5/2001 | Onoda et al. | 60/39.06 |
| 2006/0248872 A1 | * | 11/2006 | Bachovchin et al. | 60/39.12 |
| 2007/0033918 A1 | * | 2/2007 | Benz et al. | 60/39.12 |
| 2007/0033943 A1 | * | 2/2007 | Benz et al. | 60/772 |
| 2007/0125064 A1 | * | 6/2007 | Sonoda et al. | 60/39.182 |
| 2007/0137169 A1 | * | 6/2007 | Ishigami et al. | 60/39.12 |

* cited by examiner

*Primary Examiner*—William H Rodríguez
(74) *Attorney, Agent, or Firm*—Baker & McKenzie LLP

(57) ABSTRACT

A method of using an apparatus for producing electric power or mechanical drive in which fuel gas produced in a gasifier using air as an oxidant is supplied to the gasifier by extraction from the exit of the air compressor of a gas turbine.

11 Claims, 1 Drawing Sheet

PRODUCTION ENHANCEMENTS ON INTEGRATED GASIFICATION COMBINED CYCLE POWER PLANTS

CROSS REFERENCE TO RELATED APPLICATIONS

Not applicable.

FEDERALLY SPONSORED RESEARCH

Not applicable.

REFERENCE TO MICROFICHE APPENDIX

Not applicable.

FIELD OF THE INVENTION

The invention relates to the operation of an Integrated Gasification Combined Cycle Power Plant (IGCC).

BACKGROUND OF THE INVENTION

The gasification of coal by reaction with steam and air has been practiced for more than a century. For most of those years it was produced in relatively simple equipment at a pressure slightly higher than atmospheric pressure. Gas produced through coal gasification has been used to provide fuel gas for lighting and heating. In such simple gasification processes, by-products of coke, tars and light oils were produced in sufficient quantities that their values influenced the selling price of the gas. In recent years many of the outlets for the by-products have been replaced by electricity, natural gas and petroleum distillates. In order to compete with electricity, natural gas, and petroleum distillates, more sophisticated equipment for the gasification of coal has been designed and developed. Such newer sophisticated coal gasification processes operate at high pressures and use, as reactants, steam and pure or nearly pure oxygen. Such equipment is costly and complex to operate with the result that such operating units must be large to achieve good economics.

At the present time power plants for the production of electricity are large and the electricity is distributed through nation-wide networks. There is, however, still a need for plants of all sizes to supply local demands for power and cogeneration. Irrespective of the size of the plant, plant emissions must meet environmental requirements set by governmental authorities. These factors have led to difficulties in the use of coal as the primary fuel for power generation or co-generation plants.

The design of power plants has also changed with the development of the gas turbine as a highly efficient power unit, especially when combined with a heat recovery steam generator and steam turbine. Gas turbines, however, operate solely on gaseous or liquid fuels. Clean fuel gas produced by large coal gasifiers, in conjunction with clean up equipment, may be used in generating power with gas turbines. Large gasifiers which can convert from 1,200 to 2,500 tons of coal per day to gas and provide fuels to gas turbine combined cycle plants of 250 to 500 megawatt capacity are known.

Although there is a demand for gas turbine based power plants in that size range, gas produced from coal has not generally been used to produce electrical power because the complexity of the equipment and operating costs of oxygen based systems make the use of coal economically impractical. However, for many decades small and medium sized gasifiers have been used to provide fuel gas, at low pressure, to such plants as brick works, glass plants and lime kilns. Such small and medium size gasifiers use air as a reactant and so the quality of the gas produced is lower than that of the large plants that use oxygen, particularly as regards gas heating value and composition. Because the operating pressure is low the normal method for producing the air necessary for the gasification is through the installation of air blowers. The use of air blowers is very inefficient with the result that the gasification process has a low efficiency. In cases where the quantity of air is large and the pressure higher, axial flow compressors, which have high efficiencies, can be used. Such is the case with the compressors used in gas turbine engines.

The gas turbine consists of a highly efficient air compressor that supplies air to a combustion chamber in which fuel is burned. The hot gas produced flows into an expander where it produces work. This expander is connected to the compressor and also to a mechanical drive commonly to an electricity generator. It is usual to supply the fuel in the form of natural gas or fuel oil, which have heating values on the order of 21,000 British Thermal Units per pound and the fuel supplied amounts to slightly less than 2% of the air supplied. The heating value of coal gas is about 3,000 British Thermal Units per pound and to achieve the same gas temperature in the gas turbine the amount of fuel added must be at least 14% of the airflow. This leads to a substantial increase in gas flow through the expander and a consequent increase in the power produced. This higher power, in some cases, is higher than the value that can be transmitted to the electricity generator without exceeding the mechanical limits of the drive shaft. The normal method of preventing this condition is to reduce the airflow to the compressor and hence the flow through the turbine.

SUMMARY OF THE INVENTION

Embodiments of the invention provide for the improvement of the operating efficiency of low pressure gasifiers by linking the air supply to the compressors of the gas turbine being used in an Integrated Gasification Combined Cycle Power Plant (IGCC) by extracting air from the outlet of the gas turbine compressor and passing it through an expander to reduce the pressure to that required by the gasifier and at the same time producing power.

DESCRIPTION OF THE PREFERRED EMBODIMENTS

Figure 1:
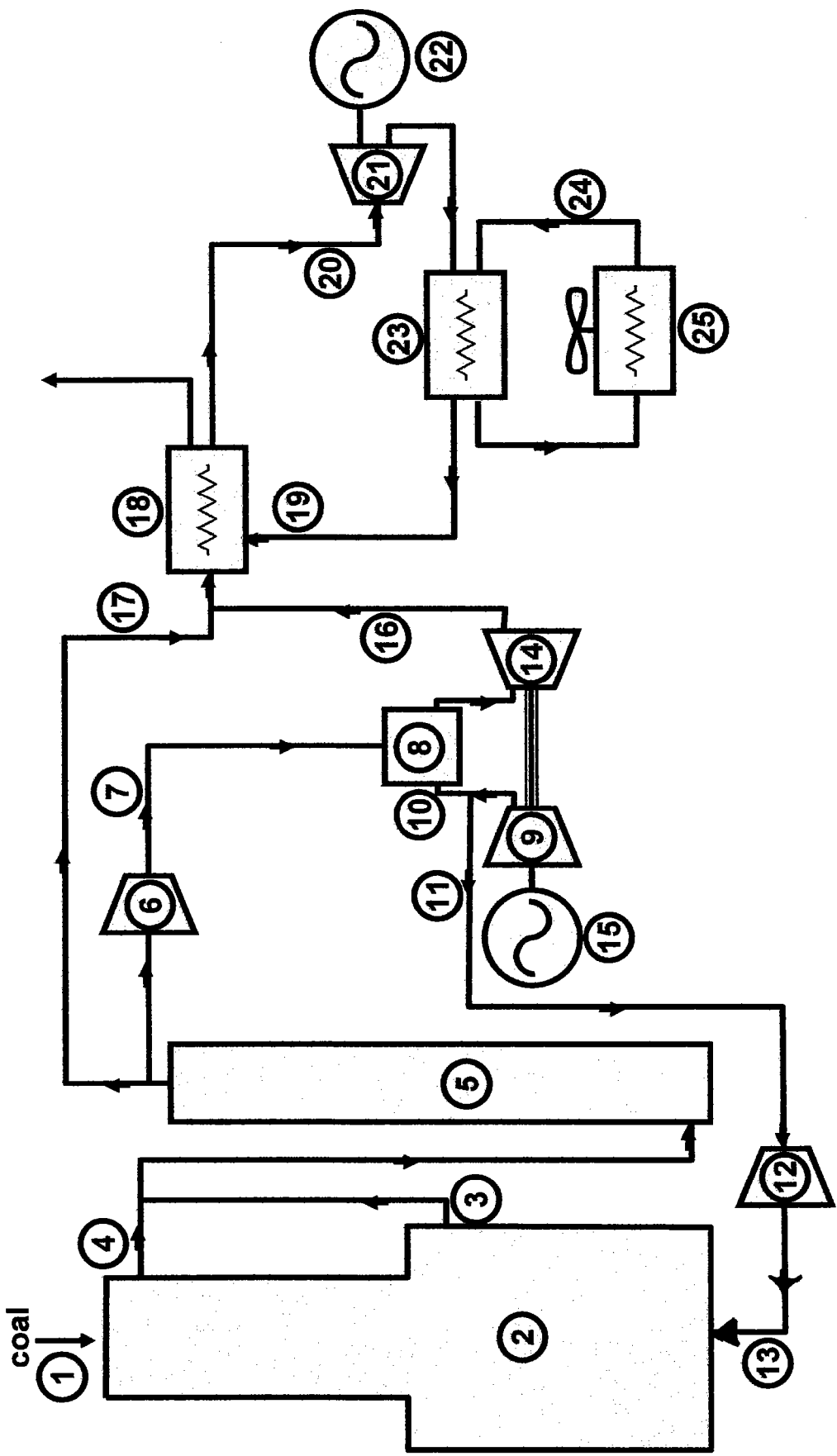
FIG. 1 is a schematic representation of a gas turbine and gasifier system.

Embodiments of the invention proposes a more efficient way to operate a gas turbine by allowing the normal amount of air to enter the compressor by extracting an amount of air from the exit of the compressor equal to the air quantity requirement of the gasifier or gasifiers. In embodiments of the inventive process, air in an amount equal to that needed by the gasifiers is withdrawn from the gas turbine air compressor, passed through an expander and fed into the gasifier, thus eliminating the need for air blowers and saving the power that such air blowers would have consumed.

Referring to FIG. 1, coal (1) is passed into a gasifier (2) where it is turned into gas. The gas leaves the gasifier at exits (3) and (4). The gas is passed into a scrubber tower (5) that removes sulfur from the gas. Some of the gas enters a compressor (6), from which it exits at a high enough pressure (7) to that needed for entry to the combustion chamber (8) of the gas turbine. Air from the gas turbine compressor (9) is split into two streams (10) and (11) of which stream (11) passes to an expander (12) and thence to the bottom of the gasifier (13). Meanwhile stream (10) passes to the combustion chamber (8) to provide the oxygen needed for the fuel to burn. The hot gas from the combustion chamber (8) passes into the gas turbine (14), which creates the power needed to drive the compressor (9) and the alternator (15). The exhaust gas from the gas turbine (16) passes to a heat recovery steam generator (18) where it is cooled by heat exchange with water (19) to provide high pressure steam (20) to drive a steam turbine (21) and electricity generator (22). Steam exiting the steam turbine (21) is cooled in a condenser (23) by cold water (24) supplied from a cooling tower (25) or by air in an air-cooled condenser. In some cases more steam, and hence more power, can be produced by burning some of the coal gas (17) in the entry duct of the heat recovery steam generator.

This embodiment of the invention relates to the gasification of coal using air and steam as the reactants to produce a product gas, which has properties suitable for use as a fuel for gas turbines. As shown in FIG. 1, air is introduced into the bottom of the gasifier to produce gas, which rises through the gasifier and leaves the ash in the coal to be removed through the bottom of the gasifier. In its passage through the gasifier the coal is converted to an acceptable fuel gas, and such reaction should occur at a pressure of from 20 to 90 pounds per square inch absolute. In some embodiments, the gasifier converts biomass into fuel gas. In other embodiments, the gasifier converts waste such as old tires, sewage sludge or corn stalks into fuel gas. In still other embodiments, the gasifier converts a mixture of coal and other materials into fuel gas. In alternate embodiments, the gasifier is a two-stage gasifier.

The gas produced is comprised of a mixture of carbon monoxide, carbon dioxide, hydrogen, nitrogen, methane, ethane, ethylene, hydrogen sulphide and a trace of carbonyl sulphide and carbon disulphide. The sulfur compounds are removed in a clean-up plant and the gas is then ready to be used and is environmentally suitable for any purpose and particularly as fuel for gas turbines.

As an example coal, with a composition of carbon 52.58%, Hydrogen 3.65%, Nitrogen 0.72%, Oxygen 13.10%, Sulfur 0.23%, Water 25.00%, Ash 4.72%, can be gasified under a pressure of 30 pounds per square inch absolute to provide gas for a gas turbine. The approximate quantity of gas produced from one gasifier would be 588,000 standard cubic feet per hour and would have a heating value of 3,118 British thermal units per pound. The composition of the gas would be approximately 28.39% Carbon Monoxide, 18.26% Hydrogen, 41.61% Nitrogen, 5.86% Carbon Dioxide, 5.08% Methane, 0.10% Ethylene, 0.13% Ethane and less than 0.01% sulfur.

The output of thirteen gasifiers producing this quality of fuel would be sufficient for a single SGT6-3000E or equivalent gas turbine to produce, at sea level and 59° F., 144 Mw of electricity. This quantity, however, exceeds the maximum, of 135 Mw, that can be transmitted to the electricity generator. Conventionally, this would be achieved by throttling the flow of air to the compressor of the gas turbine by about 10%. An alternative way to reduce the flow to the combustion chamber is to extract air from the outlet of the compressor and use it for some other purpose.

Gasifiers typically operate at a pressure of from about 30 to about 90 psia and the air must be compressed to that level. This may be achieved by the use of centrifugal blowers. It has been discovered that by extracting air from the gas turbine and reducing its pressure to that of the gasifier, by passing it through an expander, a considerable saving in the power can be gained compared with using blowers. The effect on performance and efficiency of throttling the air or extracting the air is presented in the table below.

In another example coal, with a composition of Carbon 49.21%, Hydrogen 3.51%, Nitrogen 0.71%, Oxygen 11.42%, Sulfur 0.35%, Water 29.90%, Ash 4.90%, can be gasified under a pressure of 30 pounds per square inch absolute to provide gas for a gas turbine. The approximate quantity of gas produced from one gasifier would be 575,000 standard cubic feet per hour and would have a heating value of 3,132 British thermal units per pound. The composition of the gas would be approximately 30.60% Carbon Monoxide, 16.62% Hydrogen, 42.64% Nitrogen, 4.53% Carbon Dioxide, 5.54% Methane, 0.12% Ethylene, 0.19% Ethane and less than 0.01% sulfur.

The output of a Frame 7FA turbine operating on this quality of fuel and at a temperature of 59° F. has been compared for cases with extraction and without extraction at altitudes of sea level and 5000 feet. The results are given in the table below.

| Turbine | SGT6-3000E | | Frame 7FA | | | |
|---|---|---|---|---|---|---|
| | | | Extraction | No Extraction | Extraction | No Extraction |
| KW | Throttling | Extraction | Sea Level | Sea Level | 5,000 ft. | 5,000 ft. |
| Gas Turbine | 131,631 | 131630 | 187,552 | 210.624 | 156,532 | 175,520 |
| Steam Turbine | 80,5443 | 80,544 | 124,638 | 130,798 | 100,797 | 111,516 |
| Expander | 0 | 7,847 | 11,028 | 0 | 9,076 | 0 |
| Parasitic Loss | 6,365 | 6,365 | 9,366 | 10,243 | 7,720 | 8,611 |
| Compressor | 19,977 | 19,977 | 28,316 | 31,998 | 23,635 | 26,665 |
| Blower | 6585 | 0 | 0 | 9,162 | 0 | 8,847 |
| Gas Clean Up | 777 | 777 | 1,017 | 1,017 | 837 | 837 |
| Solids Handling | 1,165 | 1,166 | 1,526 | 1,705 | 1,256 | 1,435 |
| Net Power | 179,248 | 185,055 | 282,993 | 287,297 | 232,959 | 240,540 |
| Heat Rate Btu/Kwh | 9,872 | 9,562 | 8,124 | 8,945 | 8,121 | 8,991 |
| Dry, Ash Free Coal Used ton/day | 1,565 | 1,565 | 2,048 | 2,290 | 1,686 | 1928 |

As can be seen from the table the use of extraction leads to up to 10% reduction in the fuel required and a reduction in the number of gasifiers needed per kilowatt generated.

Certain embodiments of this invention are not limited to any particular individual features disclosed, but include combinations of features distinguished from the prior art in their structures and functions. Features of the invention have been described so that the detailed descriptions that follow may be better understood, and in order that the contributions of this invention to the arts may be better appreciated. These may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. This invention is to be read to include any legally equivalent devices or methods, which do not depart from the spirit and scope of the present invention.

In conclusion, therefore, it is seen that the present invention and the embodiment(s) disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited is to be understood as referring to all equivalent elements or steps. The description is intended to cover the invention as broadly as legally possible in whatever forms it may be utilized.

I claim:

1. An apparatus for producing electric power or mechanical drive using fuel gas produced in a gasifier using air as an oxidant, wherein the air is supplied to the gasifier by extraction from the exit of a gas turbine air compressor, wherein the air for the gasifier is first passed though an expansion device to reduce its pressure to that required for it to enter the gasifier.

2. An apparatus according to claim 1 in which the amount of air extracted from the gas turbine compressor is adjusted to keep the amount of air fed into the gasifier constant.

3. An apparatus according to claim 2 in which the expansion device is an expander that produces power.

4. An apparatus according to claim 1 in which the gasifier converts coal into fuel gas.

5. An apparatus according to claim 1 in which the gasifier converts biomass into fuel gas.

6. An apparatus according to claim 1 in which the gasifier converts waste such as old tires, sewage sludge or corn stalks into fuel gas.

7. An apparatus according to claim 1 in which the gasifier converts a mixture of coal and other materials into fuel gas.

8. An apparatus according to claim 1 in which the gas produced in the gasifier is compressed to a pressure sufficient for it to be used in a gas turbine combustor.

9. An apparatus according to claim 8 in which part of the gas produced in the gasifier is passed to the entry duct of the heat recovery steam generator where it is burned to increase the gas temperature entering the heat recovery steam generator so that more high pressure steam is made.

10. An apparatus according to claim 1 in which the gas exhausting from a gas turbine is passed to a heat recovery steam generator.

11. An apparatus according to claim 1, in which the gasifier is a two-stage gasifier.

* * * * *